May 26, 1931.                F. L. HUNT                1,806,628
           AIR MOTOR ELECTRIC GENERATING AND STORAGE SYSTEM
                    Filed May 24, 1926      2 Sheets-Sheet 2
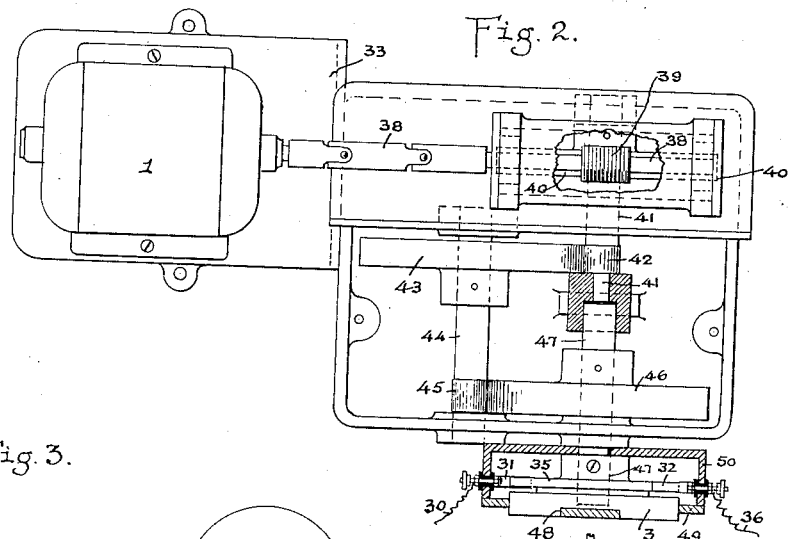
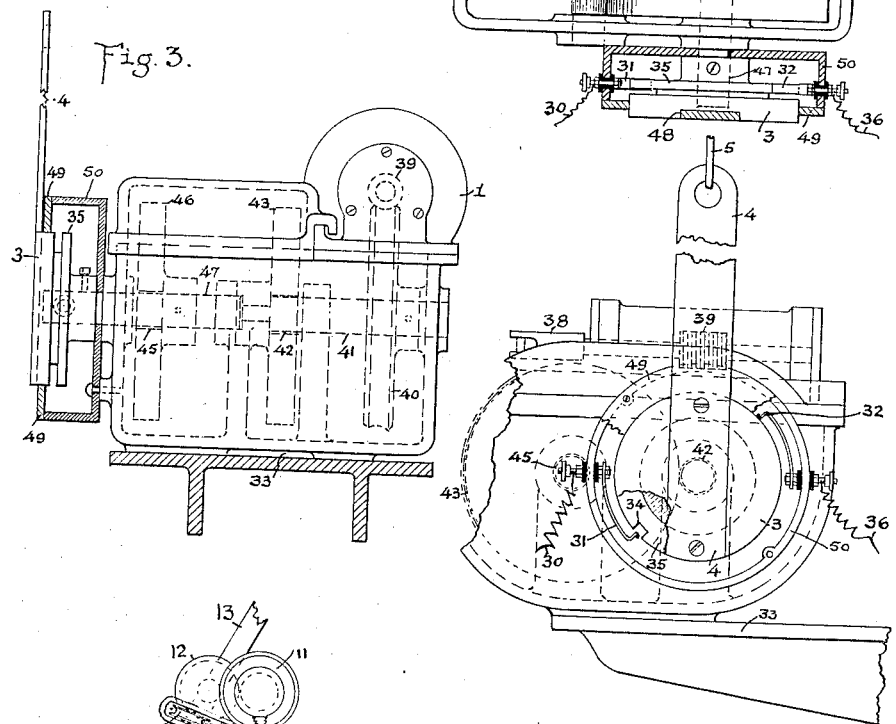
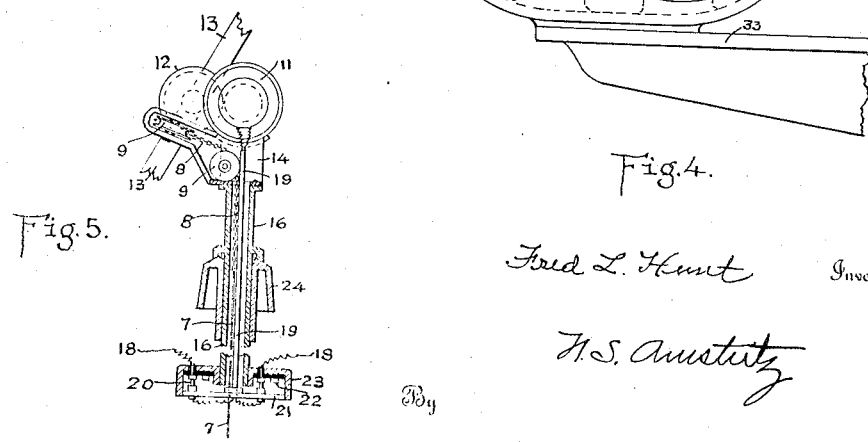

Patented May 26, 1931

1,806,628

UNITED STATES PATENT OFFICE

FRED L. HUNT, OF MISHAWAKA, INDIANA, ASSIGNOR TO PERKINS CORPORATION, OF SOUTH BEND, INDIANA, A CORPORATION OF INDIANA

AIR MOTOR ELECTRIC GENERATING AND STORAGE SYSTEM

Application filed May 24, 1926. Serial No. 111,226.

My invention relates to improvements in air motor electric generating and storage systems and it more especially consists of the features pointed out in the annexed claim.

The broad purpose of my invention is to provide an automatic control for setting an air motor, electric generating unit into and out-of-action dependent on the condition of a storage battery connected to the generator; that provides means for automatically connecting and disconnecting the generator to the storage battery under defined high and low voltage limitations; that utilizes an electric control mechanism for mechanically putting the air motor into the wind to start the generator when the battery has become discharged to a certain point and as soon as the depletion of the battery has been made good the control mechanism automatically shifts the air motor out of the wind to stop the charging; that uses any well known type of ampere hour meter for automatically sending current from the battery to the control mechanism at a low charge and at a full charge condition of the battery; and that economizes in the cost of installing my control mechanism, when located at considerably distances from the battery, by utilizing one of the generator wires at one side of the line which connects my automatic control to the battery.

With these and other ends in view, I illustrate in the accompanying drawings such instances of adaptation as will disclose the broad underlying features without limiting myself to the specific details shown thereon and described herein.

Fig. 2 is a top plan view of the control mechanism.

Fig. 3 is an end elevation of Fig. 2.

Fig. 4 is an elevation of the crank disk and adjacent parts partly in section.

Fig. 5 is an elevation in section of the tower support for the generating set.

Figure 1:
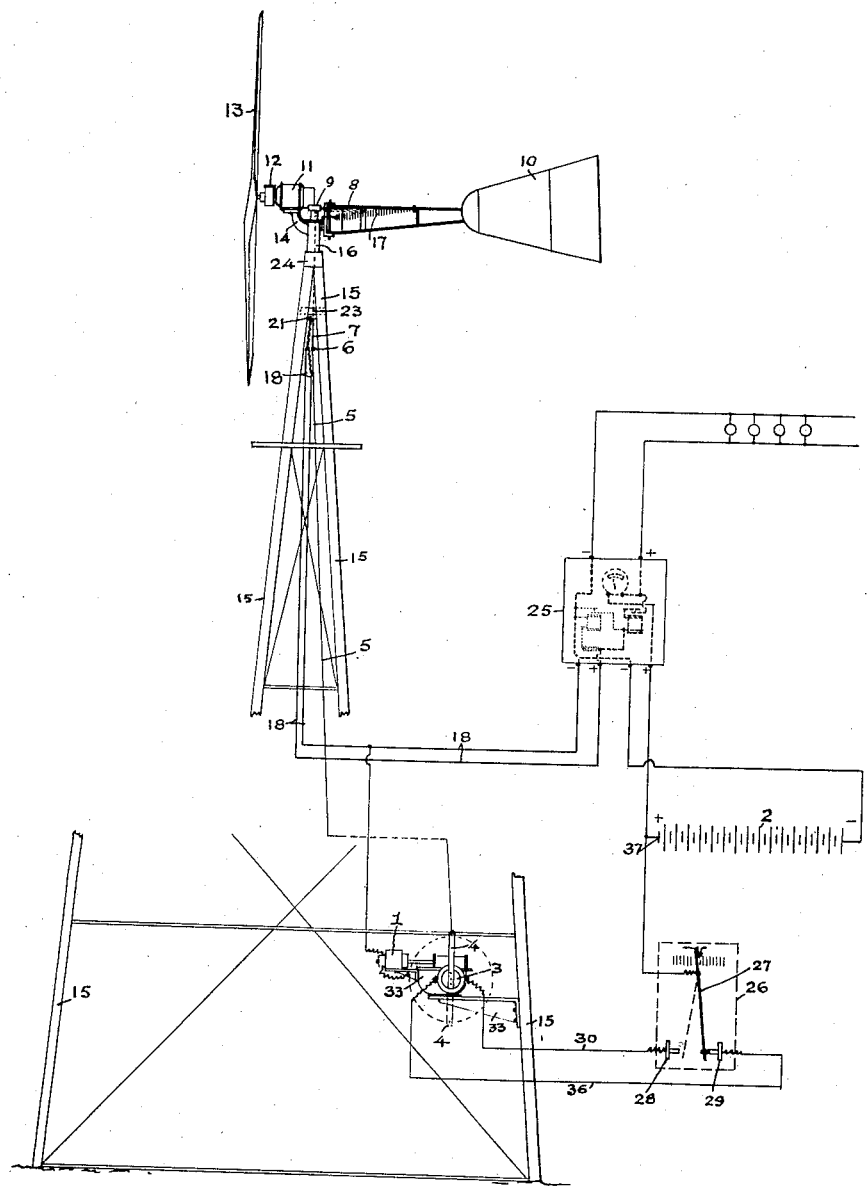
Figure 1 is a diagrammatic view of the interrelated circuits and mechanisms.

In carrying out my invention I may use whatever alternative adaptations that the exigencies of varying practical conditions demand without departing from the spirit of my invention.

Air actuated electric generating plants as heretofore used require the use of a hand control for setting the driving mechanism into action when the stored current has been used to a certain point and to similarly, by hand, disconnect the driving mechanism when the battery is again fully charged. Manual operation of this kind is not serviceable where the supply of current to distributing mains must be supplied continuously without interruption. This means that an automatic mechanism must be provided to turn the air motor into the wind when and after a given amount of current has been taken from the battery, and to automatically shift the air motor out of the wind when the battery has become fully charged.

I accomplish this automatic control by means of a very small capacity motor 1 operating a high reduction train of gears so as to make a minimum demand on the battery 2 for regulating current. The slow moving end disk 3 of the control mechanism carries a crank arm 4 which is connected to the pull-out wire 5. This wire is connected through a swivel joint 6 to a pull-out bar 7 fastened to a jerk chain 8 which passes over suitable sheaves 9 to the rudder 10 of the air motor. One half of a revolution of this crank 4 will swing the rudder 10 approximately 90 degrees on a horizontal plane in one direction and the other half of the revolution of the crank 4 will swing the rudder to the same extent in an opposite direction.

When the air motor is in operation, it drives generator 11, through a suitable gear transmission 12 located between the generator and propeller 13, and to one side of the generator axis. The generator is supported on a saddle 14 that is positioned on the top of a tower 15 for movement on a vertical hollow spindle 16 in a horizontal plane, throughout 360 degrees. As long as the hinged rudder 10 is held at right angles to the plane of motion of the propeller blades the propeller 13 will rotate and drive the generator 11. When the rudder is swung horizontally against the action of the governor spring 17 so as to stand parallel with the blades of the propeller 13, the propeller is brought to rest. The to and fro movement of the rudder 10 is automatically effected by the motor 1 of my control mechanism.

Under ordinary wind conditions the propeller 13 will normally rotate at right angles to the axis of the rudder 10 and as the wind increases the horizontal angular relation of the rudder to the plane of motion of the propeller will be gradually reduced in opposition to the governor spring 17 so as to more or less automatically hold the speed of the propeller from becoming excessive. This automatic function is due to the axis of the propeller being offset horizontally from the axis of the generator 11.

The mains 18 from the generator are led down through the hollow spindle 16 of the generator support 14 within an enclosing tube 19 onto a pair of carbon brushes 20 insulated from a casting 21 secured to the lower end of the tube 19. These contact with a pair of insulated rings 22 fastened on the underside of a weather proof casing 23 that is firmly attached to the tower 15. The pull-out bar 7 for operating the rudder 10 also passes down through the hollow generator support 16. By reason of the support 16 forming a vertical pivot on the tower cap 24 and the cooperation of the collector rings 22, the air motor can swing freely to any point of the compass.

The generator wires 18 lead from the collector rings 22 to a panel board 25 and from there to the storage battery 2. The panel board 25 comprises the usual fuses, an ammeter, and minimum and maximum voltage coils or any well known type of relay. In addition to this panel board 25 an ampere hour meter 26 of any well known type is connected to the generator and battery circuits 18. It mechanically controls a contact finger 27 that has positive positional movement between two insulated contacts 28 and 29. One of these contacts 28 is connected by wire 30 to one of the contact springs 31 on the control mechanism and the other contact 29 of the ampere hour meter 26 is connected by wire 36 to the other contact spring 32 of the control mechanism. One side of the control mechanism motor 1 is grounded to its supporting bracket 33 and the other side may be connected to the negative wire of the generator-battery circuit 18, thus effecting considerable economy in that a large cross section separate wire is not required. In installations of this kind, on farm premises, the tower with its attached control mechanism is usually found at a considerable distance away from the house where the battery, panel board and ampere hour meter are located. As the panel board and ampere hour meter embody features which are well known in the art, these are not shown in detail.

The contacts 28 and 29 of the ampere hour meter 26 are so connected to the control mechanism and to the positive side 37 of the battery 2 as to set the control mechanism motor 1 into operation and in turn set the propeller 13 into action when connection is made by an ampere hour meter contact 28. When the other ampere hour contact 29 is engaged, current from the battery 2 will flow to the control mechanism motor 1 so as to actuate it and move the pull-out crank 4 one-half revolution, automatically stopping itself by reason of a disk contact spring 31 being opposite a notch 34 formed in a contact disk 35 which moves with the pull-out crank 4 leaving the other contact spring 32 in engagement with the disk 35 so that in the next shift of the finger 27 of the ampere hour meter 26 another half revolution of the pull-out crank 4 will be produced and the reverse movement effected of the rudder 10.

The control mechanism is fastened to a supporting bracket 33 that is attached to one of the corner uprights of the tower 15. It comprises a very small capacity motor 1 that is set in motion intermittently by the ampere hour meter 26. The motor shaft 38 is flexibly connected to a worm 39 that meshes with a worm gear 40 attached to a transverse shaft 41. On this shaft 41 a pinion 42 is secured. It meshes with a spur gear 43 on an intermediate shaft 44. A pinion 45 fastened to this shaft in turn meshes with a spur gear 46 on a third shaft 47 which makes a reduction in speed of 4000:1. The third shaft 47 at its outer end carries a disk 3 that has a slot 48 across its outer face in which the pull-out crank 4 is secured. A contact disk 35 which has a single notch 34 in its circumference may be made a part of the other disk so as to rotate with it. A cover ring 49 surrounds the pull-out crank disk 4 to enclose two spring contacts 31 and 32 which are placed diametrically opposite each other and are supported in the casing 50 in an insulated manner.

When the control mechanism is at rest one of the contact springs terminates in the notch 34 of the contact disk 35—its circuit broken, while the other spring is in contact with the disk 35—its circuit completed. As heretofore stated, the motor 1 has one terminal grounded on its supporting frame and casing 33, thus forming a metallic connection with the contact disk 35. The other terminal of the motor is connected to the negative side of the generator-battery circuit 18.

The panel board instruments or any well known relays act to prevent the battery 2 feeding back into the generator 11 when its speed is reduced enough to bring its voltage below that of the battery and they also prevent excessive voltage in the generator due to broken or corroded battery connections, etc. or excessive speed of the propeller. As precautionary features in general are known in battery practice and the ampere hour mechanism is also known, these accessories as heretofore stated are not described in detail.

Strictly considered, in a technical sense, the designation "propeller" should be impeller instead, but long usage countenances the former name.

What I claim is:

An automatic regulator system in which a small capacity high speed motor has its speed reduced approximately four thousand times for operating the vane of an air motor generating set, which system comprises an inner notched disk rotatable at a slow speed, an open ended casing surrounding the disk, electric contacts for the disk supported by the casing, a cover having a central opening, and an outer disk of substantially the same diameter rotatable with the inner disk the periphery of the outer disk closing the opening in the cover and serving to control the stopping and starting of the air motor generating set.

In testimony whereof I affix my signature.

FRED L. HUNT.